United States Patent
Lee et al.

(10) Patent No.: US 7,075,608 B2
(45) Date of Patent: Jul. 11, 2006

(54) RUBBING CLOTH FOR ALIGNING A LIQUID CRYSTAL, METHOD OF MANUFACTURING THE SAME, APPARATUS FOR MANUFACTURING THE SAME AND METHOD OF MANUFACTURING A LIQUID CRYSTAL DISPLAY USING THE SAME

(75) Inventors: Bong-Woo Lee, Cheonan-si (KR); Hyo-Hak Nam, Suwon-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 430 days.

(21) Appl. No.: 10/397,670

(22) Filed: Mar. 25, 2003

(65) Prior Publication Data

US 2004/0189912 A1 Sep. 30, 2004

(51) Int. Cl.
*G02F 1/1337* (2006.01)

(52) U.S. Cl. .......................... 349/126; 349/125; 156/99; 492/29

(58) Field of Classification Search ................. 349/126, 349/155, 125; 156/99; 492/29
See application file for complete search history.

(56) References Cited

U.S. PATENT DOCUMENTS

| 4,548,850 | A | | 10/1985 | Stauder et al. |
| 5,336,543 | A | | 8/1994 | Pyle |
| 5,710,608 | A | * | 1/1998 | Nakabayashi et al. ...... 349/125 |
| 5,710,610 | A | | 1/1998 | Kim |
| 5,879,497 | A | * | 3/1999 | Nakahara et al. ............. 156/99 |
| 6,122,032 | A | * | 9/2000 | Mihara et al. ............. 349/155 |
| 6,313,897 | B1 | * | 11/2001 | Murayama et al. ......... 349/126 |

* cited by examiner

*Primary Examiner*—Huyen Ngo
(74) *Attorney, Agent, or Firm*—DLA Piper Rudnick Gray Cary US LLP (57) ABSTRACT

Disclosed are a rubbing cloth for aligning a liquid crystal, method of manufacturing the same, apparatus for manufacturing the same and method of manufacturing an LCD using the same. A rubbing pile formed on a rubbing cloth fabric fabricated by interweaving a weft and a warp having a length longer than that of the weft is aligned in a direction parallel to the weft. Accordingly, it is able to manufacture the rubbing cloth having a various size without a length of the alignment film and increase yield of the rubbing cloth.

6 Claims, 10 Drawing Sheets

RUBBING CLOTH FOR ALIGNING A LIQUID CRYSTAL, METHOD OF MANUFACTURING THE SAME, APPARATUS FOR MANUFACTURING THE SAME AND METHOD OF MANUFACTURING A LIQUID CRYSTAL DISPLAY USING THE SAME

TECHNICAL FIELD

The present invention relates to a rubbing cloth and an LCD (Liquid Crystal Display), and more particularly to a rubbing cloth for aligning a liquid crystal, method of manufacturing the same, apparatus for manufacturing the same and method of manufacturing an LCD using the same.

BACKGROUND ART

In general, an LCD apparatus displays image information using electro-optics properties of a liquid crystal. Some LCD apparatus transmits a light when an electric field is not applied to the liquid crystal. But some LCD apparatus intercepts a light when an electric field is not applied to the liquid crystal, and transmits the light when the electric field is applied to the liquid crystal.

Some LCD apparatus intercepts a light when an electric field is not applied to the liquid crystal, and the LCD apparatus transmits the light when the electric field is applied to the liquid crystal.

In order to precisely transmit the light through the liquid crystal, the light that is able to transmit the liquid crystal should be supplied to the liquid crystal after uniformly aligning the liquid crystal toward an uniform direction. An alignment of the liquid crystal is performed by means of an alignment film, and the light that is able to transmit the liquid crystal can be obtained by a polarizing plate.

The alignment film is as a polyimide thin film layer. When rubbing the alignment film against a rubbing cloth toward the uniform direction, an alignment groove is formed on the alignment film. The alignment of the liquid crystal is performed by means of the alignment groove. The rubbing cloth wind around an outer circumference of a rubbing roller, and the alignment groove is formed on the alignment film by rubbing the rubbing roller having the rubbing cloth against the alignment film.

Hereinafter, manufacturing processes of the rubbing cloth will be described with reference to FIGS. 1A to 1F. Here, a term referred to as a "rubbing cloth fabric" indicates a cloth having a length and a width shorter than the length.

Figure 1A:
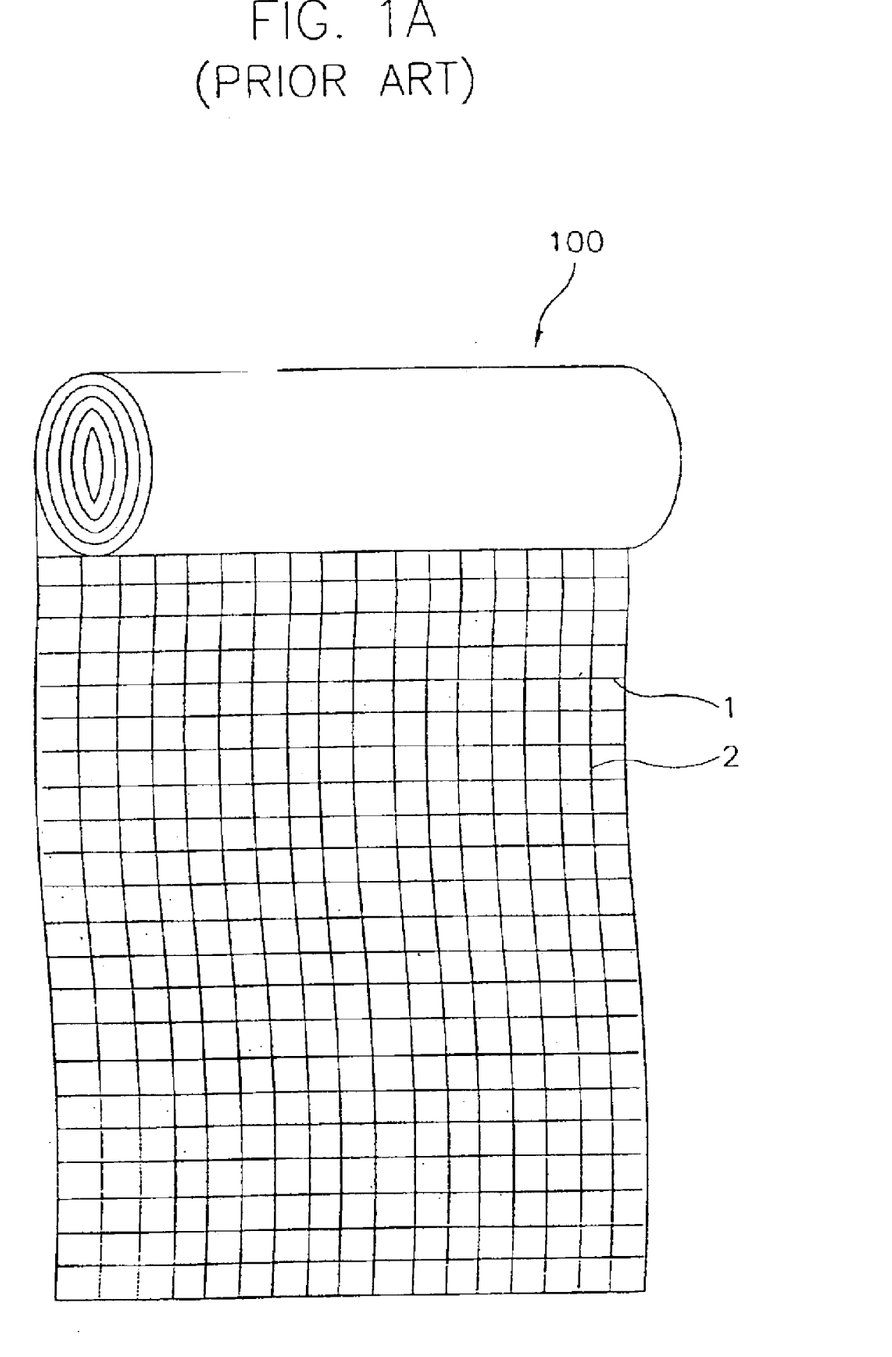
FIG. 1A is a view showing a conventional rubbing cloth fabric for rubbing cloth.
Figure 1B:
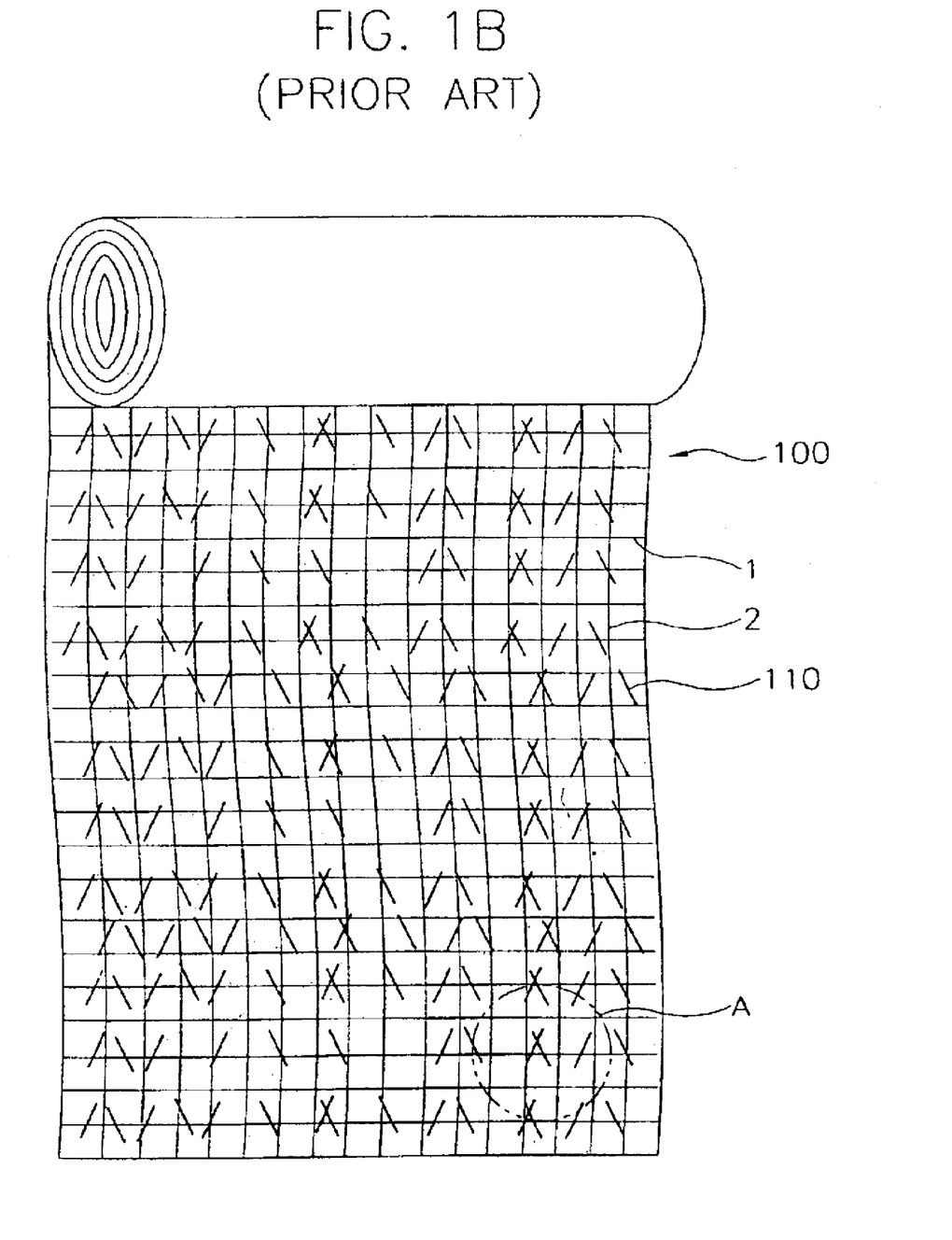
FIG. 1B is a view showing a rubbing pile disposed on the rubbing cloth fabric shown in FIG. 1A.
Figure 1C:
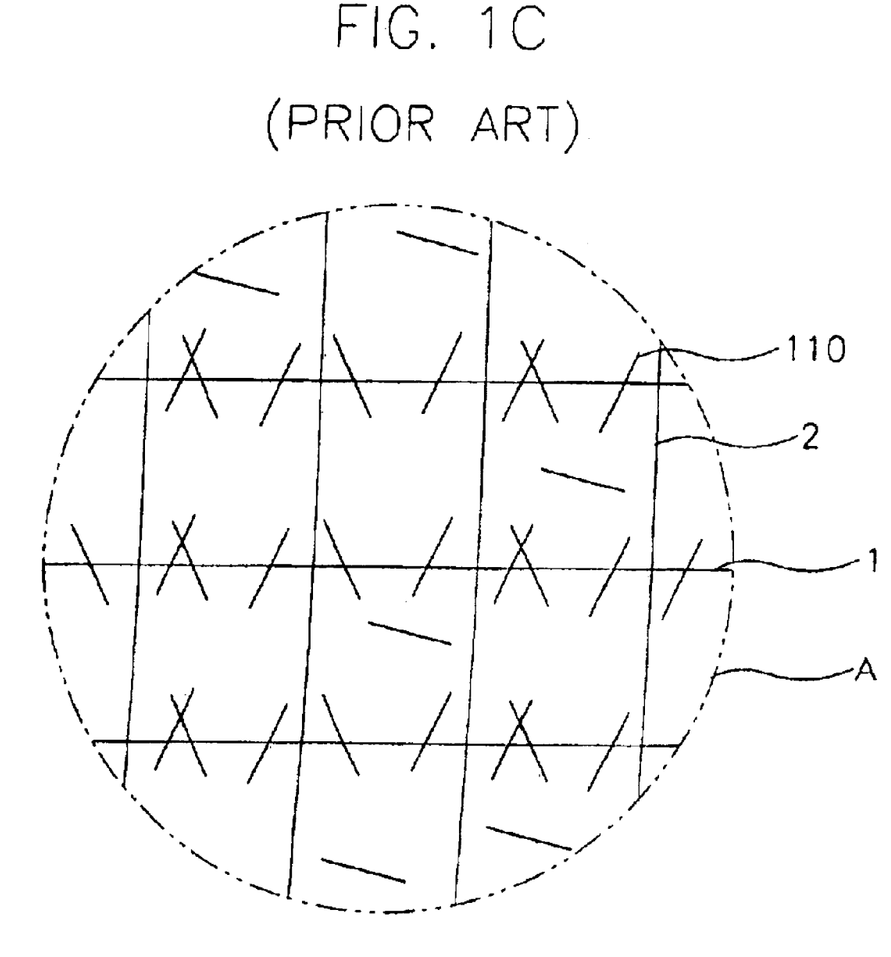
FIG. 1C is an enlarged view of 'A' shown in FIG. 1B.

Referring to FIG. 1A, the rubbing cloth fabric 100 is manufactured by interweaving a weft 1 with a warp 2, the warp 2 intersecting the weft 1 and having a length longer than that of the weft 1. The rubbing cloth fabric 100 includes a rubbing pile 110 irregularly formed on the rubbing cloth fabric 100 as shown in FIGS. 1B and 1C.

Figure 1D:
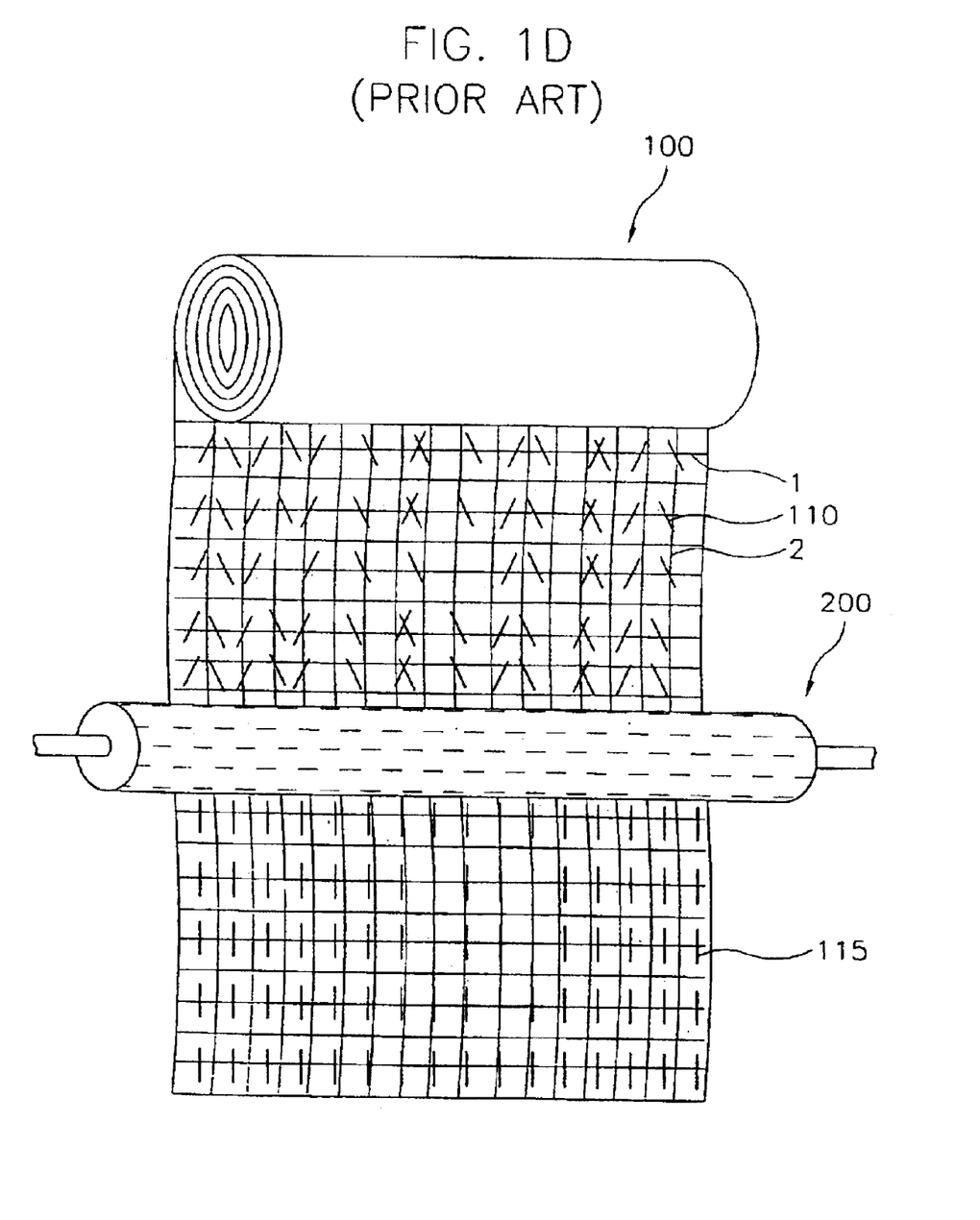
FIG. 1D is a view illustrating a process for aligning the rubbing pile shown in FIG. 1B.

FIG. 1D is a view showing a process for aligning the rubbing pile irregularly formed on the rubbing cloth fabric.

Referring to FIG. 1D, a roller brush 200 for rearranging the rubbing pile 110 is disposed in a direction parallel to a width direction of the rubbing cloth fabric 100. The width direction is the same direction in which the weft 1 is formed on the rubbing cloth fabric 100. When the roller brush 200, which is in contact with the rubbing cloth fabric 100, is transferred, the rubbing pile 110 is realigned in a direction parallel to the warp 2. The realigned rubbing pile has been allowed to have a reference numeral "115".

Figure 1E:
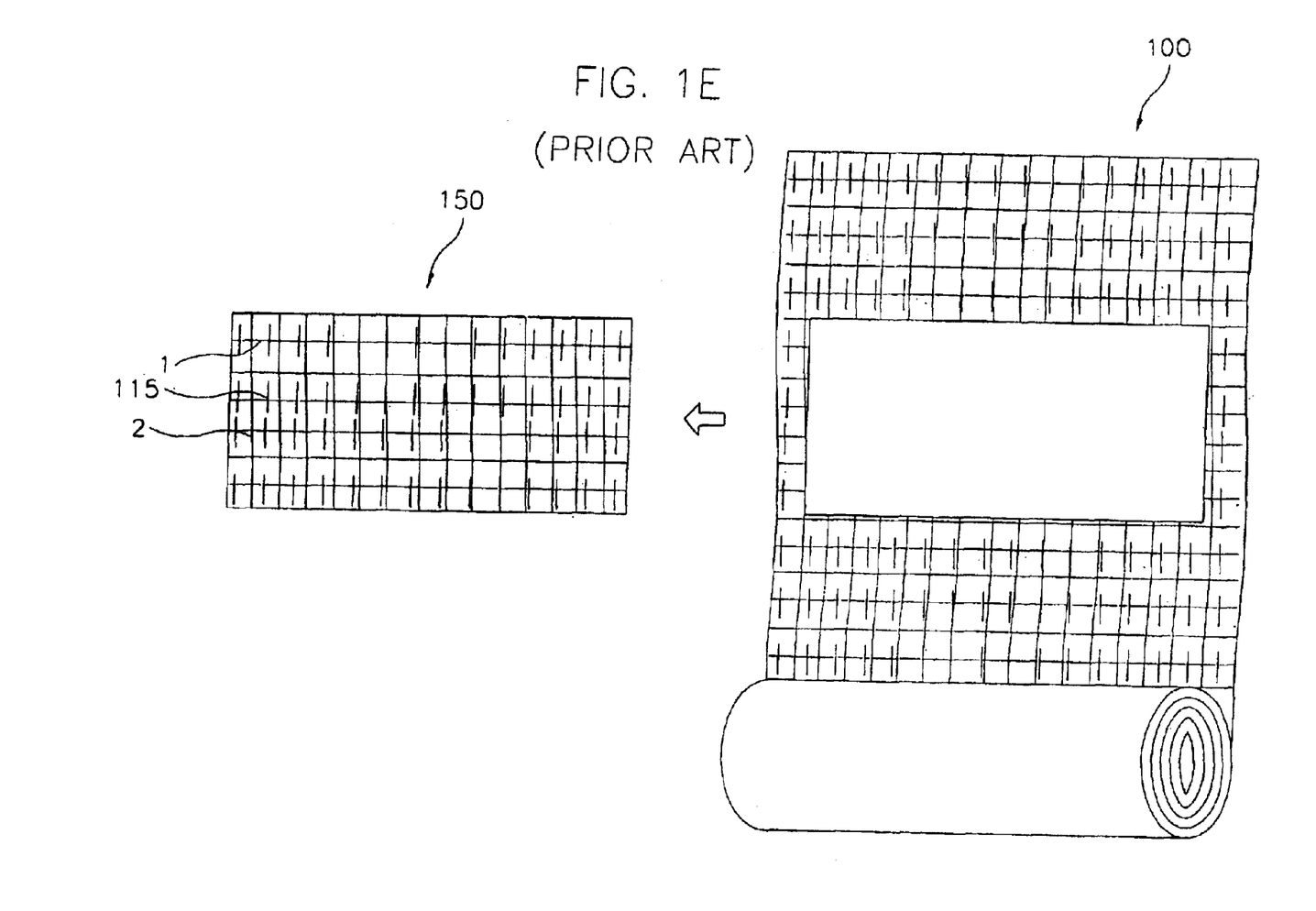
FIG. 1E is a view showing a rubbing cloth formed by cutting the rubbing cloth fabric shown in FIG. 1D.

As shown in FIG. 1E, the rubbing cloth fabric 100 having the realigned rubbing pile 115 is cut into pieces. A piece of rubbing cloth fabric which is cut from the rubbing cloth fabric 100 is defined as a rubbing cloth 150.

The rubbing cloth 150 is attached onto a rubbing roller 300 which has a length longer than a width of the alignment film. In order to attach the rubbing cloth 150 onto the rubbing roller 300, the rubbing cloth 150 has a length similar to a length of the rubbing roller 300, and has a width similar to a length of the circumference surface of the rubbing roller 300. That is, the warp 2 of the rubbing cloth 150 is aligned along the circumference surface of the rubbing roller 300, the weft 1 is aligned in the length direction of the rubbing roller 300, and the rubbing pile 110 is aligned parallel to the weft 1.

Figure 1F:
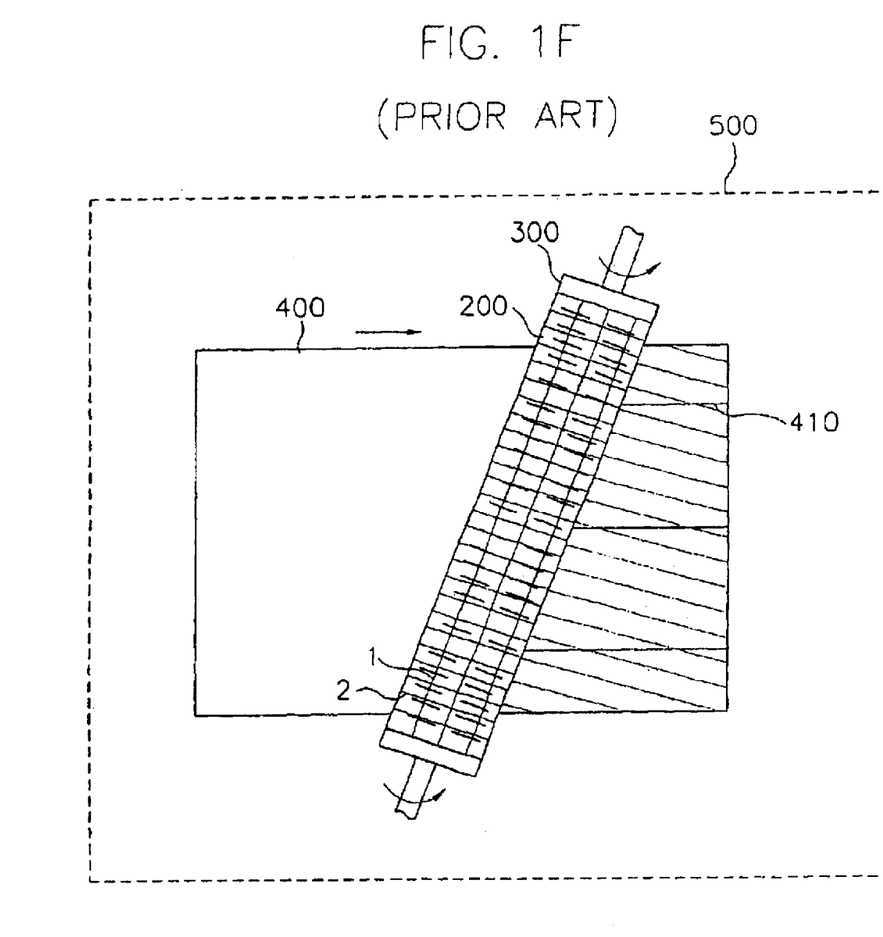
FIG. 1F is a view illustrating a process for rubbing an alignment film using the conventional rubbing cloth shown in FIG. 1E.

As shown in FIG. 1F, when the rubbing roller 300, on which the rubbing cloth 150 is wound, rotates and simultaneously applies pressure to the alignment film 400, the alignment groove is formed on the alignment film 400.

However, when the alignment groove is formed by means of the conventional rubbing roller 300 to which the rubbing cloth 150 is attached, the liquid crystal cannot be precisely aligned with the alignment groove due to a scratch formed on the alignment film 400. It is difficult to totally control a tension of the rubbing cloth fabric 100 when the rubbing roller 300 is rubbed against the alignment film 400 along the warp 2. When the tension of the rubbing cloth fabric 100 is not precisely controlled, the rubbing pile 110 is irregularly distributed on the rubbing cloth fabric 100. Therefore, the liquid crystal cannot be precisely aligned with the alignment groove.

Also, when the alignment film 500 has a larger size than that of the rubbing cloth 150, as shown as reference numeral 500 in FIG. 1E, it is not possible to form the alignment groove by means of the rubbing cloth fabric 100 having a width shorter than that of the alignment film 500.

DISCLOSURE OF THE INVENTION

The present invention provides a rubbing cloth having a rubbing pile regularly distributed on an alignment film.

The present invention also provides a method of manufacturing a rubbing cloth having a rubbing pile regularly distributed on an alignment film.

The present invention also provides an apparatus for manufacturing a rubbing cloth having a rubbing pile regularly distributed on an alignment film.

The present invention also provides a method of manufacturing an LCD.

In one aspect of the invention, there is provided a rubbing cloth for aligning a liquid crystal, the rubbing cloth being formed by cutting a portion of a rubbing cloth fabric in a length direction of a warp on the rubbing cloth fabric, wherein the rubbing cloth fabric comprising: a warp having a first length; a weft having a second length shorter than the first length and being interweaved with the warp; and a rubbing pile aligned along the length direction of the weft.

In another aspect, there is provided a method for manufacturing a rubbing cloth for aligning liquid crystal, comprising: making a rubbing cloth fabric including a warp having a first length, a weft having a second length shorter than the first length and being interweaved with the warp, and a rubbing pile irregularly formed on the rubbing cloth fabric; aligning the rubbing pile in a length direction of the weft; and cutting the rubbing cloth fabric in a length direction of the warp.

In further aspect, there is provided an apparatus for manufacturing a rubbing cloth, comprising: a rubbing belt installed in a width direction of a rubbing cloth fabric, wherein the rubbing cloth fabric includes a warp having a first length, a weft having a second length shorter than the first length and being interweaved with the warp, and a rubbing pile formed on a surface of the rubbing cloth fabric; a pulley for receiving a rotating force and rotating the rubbing belt in response to the rotating force; and means for supplying the rotating force to the pulley.

In still another aspect, there is provided a method for manufacturing an LCD, comprising: fabricating a TFT substrate having a TFT, a power supply line for supplying a power to the TFT, and a pixel electrode for receiving the power outputted from the TFT; fabricating a color filter substrate having RGB pixels and a common electrode, and being coupled to the TFT substrate; forming a rubbing groove by rubbing a rubbing roller against an alignment film formed on the TFT substrate and the color filter substrate, wherein the rubbing roller is wound with a rubbing cloth formed by cutting a rubbing cloth fabric, and wherein the rubbing cloth fabric has a warp having a first length, a weft having a second length shorter than the first length and being interweaved with the warp, and a rubbing pile aligned along the length direction of the weft; assembling the TFT substrate with the color filter substrate; and interposing a liquid crystal between the TFT substrate and the color filter substrate.

According to the present invention, the rubbing cloth is formed by interweaving the warp with the weft having a length shorter than that of the warp and the rubbing pile is aligned parallel to the warp. Accordingly, it is able to manufacture the rubbing cloth having a various size without a length of the alignment film and increase yield of the rubbing cloth.

BRIEF DESCRIPTION OF THE DRAWINGS

The above and other advantages of the present invention will become readily apparent by reference to the following detailed description when considered in conjunction with the accompanying drawings wherein.

BEST MODE FOR CARRYING OUT THE INVENTION

Figure 2A:
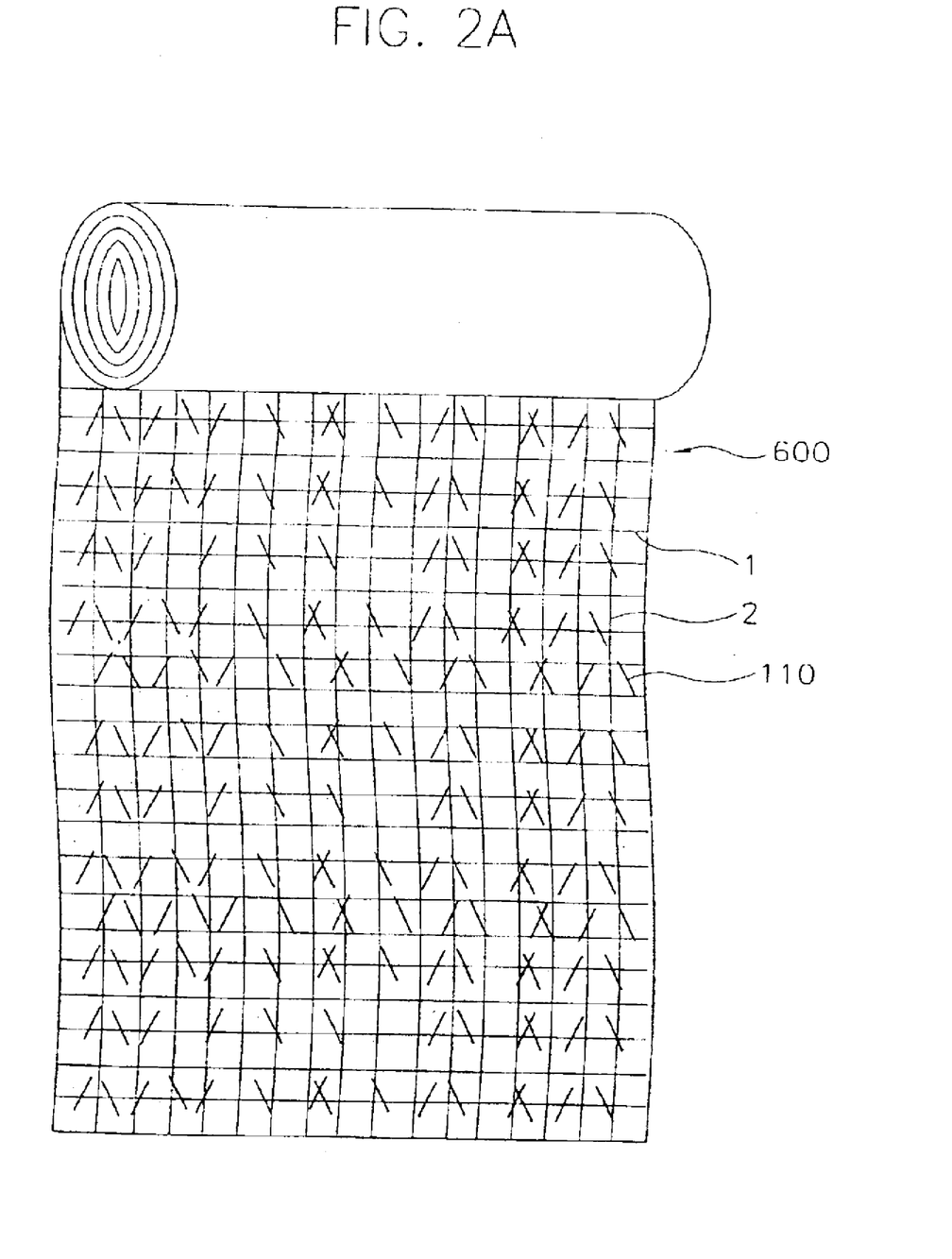
FIG. 2A is a view showing a rubbing cloth fabric on which a rubbing pile is formed according to one preferred embodiment of the present invention.
Figure 2B:
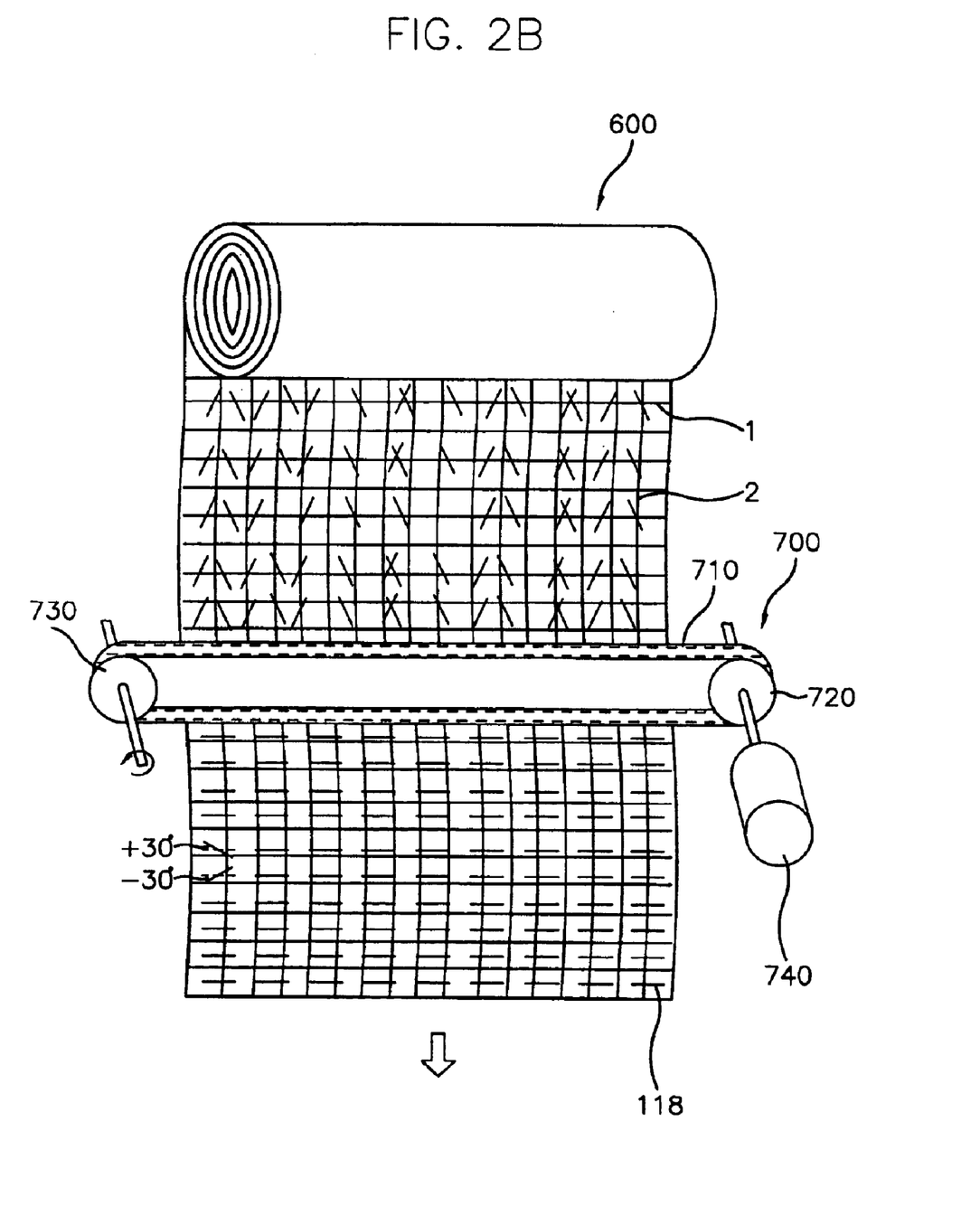
FIG. 2B is a view illustrating a process for aligning the rubbing pile formed on the rubbing cloth fabric shown in FIG. 2A.
Figure 2C:
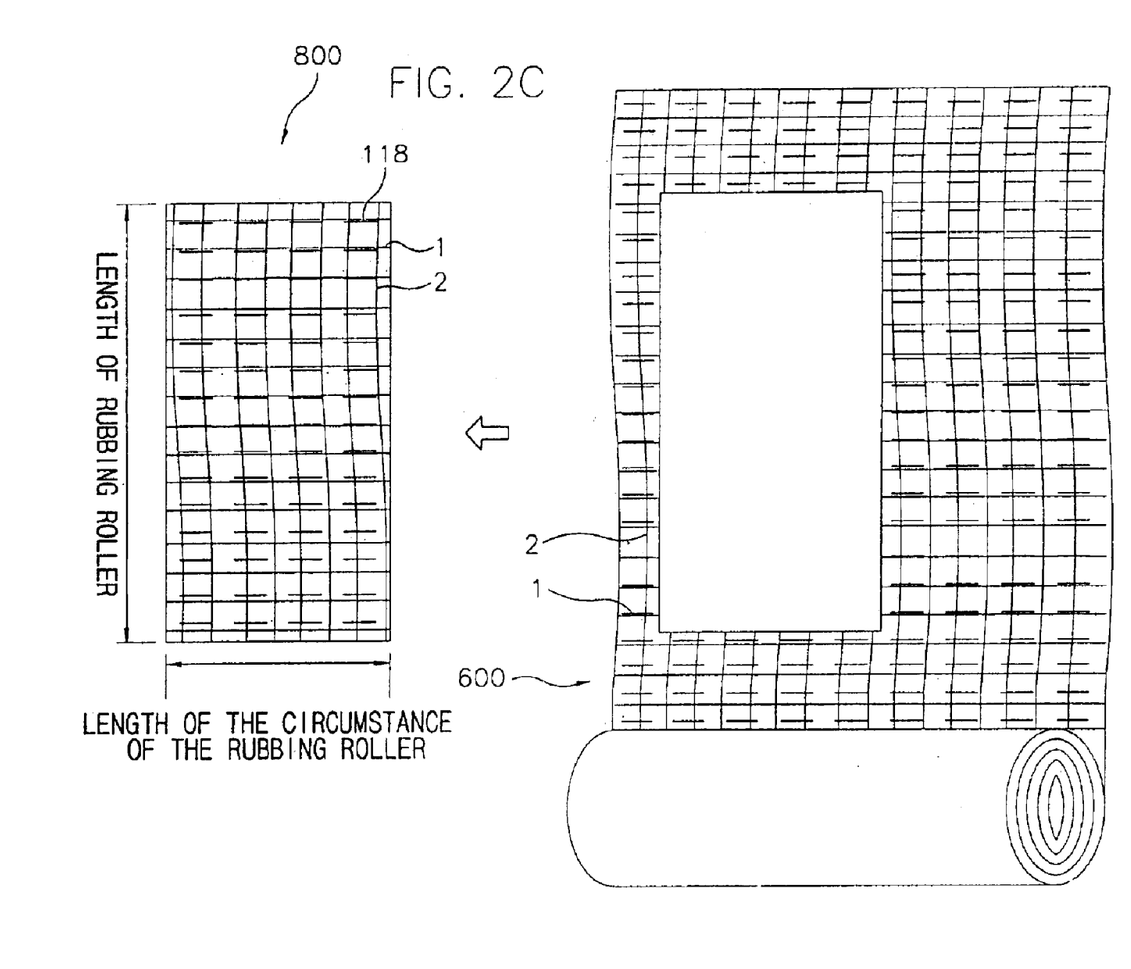
FIG. 2C is a view showing a rubbing cloth formed by cutting the rubbing cloth fabric shown in FIG. 2B.

FIG. 2C is a view showing a rubbing cloth for aligning a liquid crystal according to the present invention.

Referring to FIG. 2C, the rubbing cloth 800 includes a rubbing cloth fabric 600 and a rubbing pile 118 disposed on the rubbing cloth fabric 600.

The rubbing cloth fabric 600 is fabricated by interweaving a weft 1 with a warp 2 having a length longer than that of the weft 1. The rubbing pile 118 having a length shorter than that of the weft 1 is disposed on the rubbing cloth fabric 600. The rubbing pile 118 is aligned at an angle about ±30 degrees with respect to the weft 1. Preferably, the rubbing pile 118 is aligned parallel to the weft 1 of the rubbing pile 118.

Disposing the rubbing pile 118 to have the direction parallel to the weft 1 is for precisely controlling a tension of the rubbing cloth fabric 600. When the rubbing pile 118 is aligned to have a direction parallel to the warp 2 having the length longer than that of the weft 1, the tension of the rubbing cloth fabric 600 cannot be precisely controlled, and the rubbing pile 118 is irregularly aligned, so that rubbing processes are not precisely performed. When the rubbing pile 118 is aligned to have a direction parallel to the weft 1 having the length shorter than that of the warp 2, the tension of the rubbing cloth fabric 600 can be precisely controlled, thereby preventing the rubbing pile 118 from being irregularly aligned.

Figure 2D:
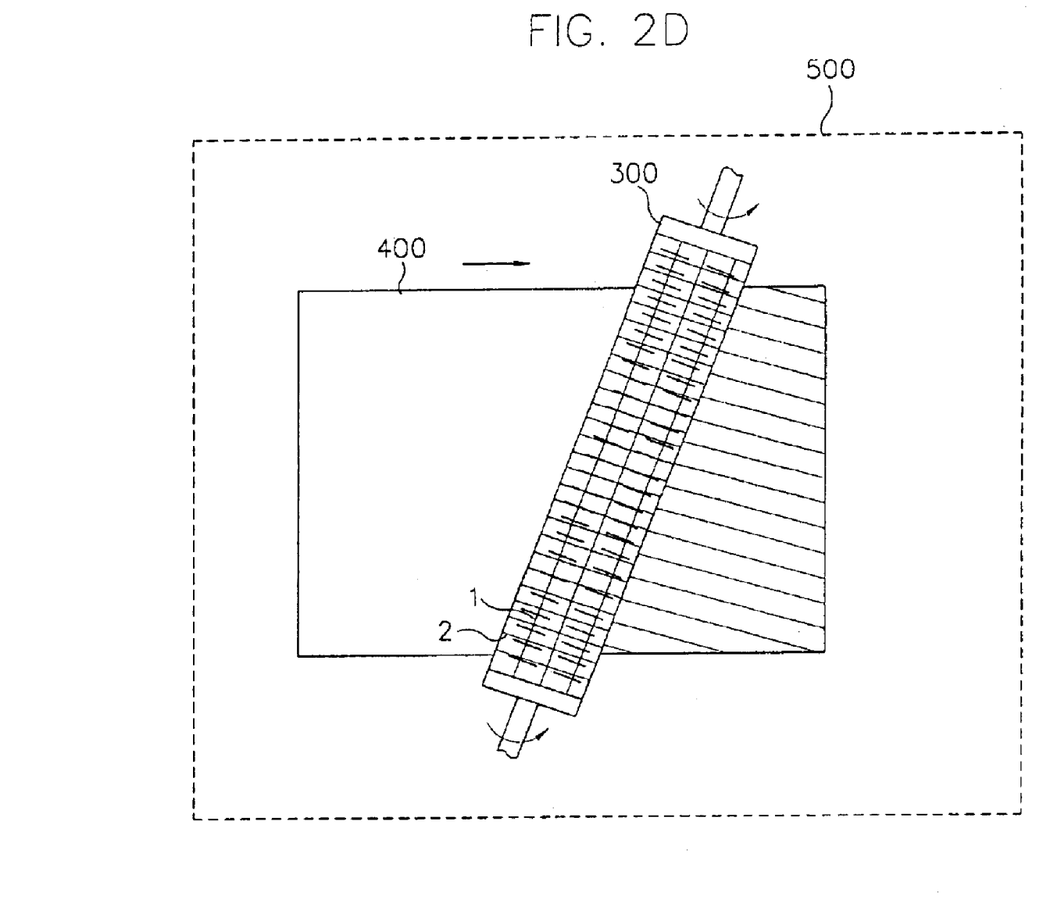
FIG. 2D is a view illustrating a process for forming an alignment groove on an alignment film using the rubbing cloth shown in FIG. 2C.

Hereinafter, a method for manufacturing the rubbing cloth will be described with reference to FIGS. 2A to 2C and rubbing processes performed by the rubbing cloth will be described with reference to FIG. 2D.

Referring to FIG. 2A, the rubbing cloth fabric 600 includes the weft 1 and the warp 2 having the length longer than that of the weft 1. The weft 1 is interweaved with the warp 2 in order to fabricate the rubbing cloth fabric 600. The rubbing pile 110 is irregularly disposed on the rubbing cloth fabric 600.

The direction that the warp 2 is formed on the rubbing cloth fabric 600 is defined as a length direction of the rubbing cloth fabric 600, and a direction that the weft 1 is formed on the rubbing cloth fabric 600 is defined as a width direction of the rubbing cloth fabric 600.

As shown in FIG. 2B, the rubbing pile 110 disposed on the rubbing cloth fabric 600 is realigned by means of a belt shape rubbing apparatus 700. The realigned rubbing pile has been allowed to have a reference numeral "118".

The rubbing apparatus 700 includes a rubbing belt 710 for realigning the rubbing pile 110, first and second pulleys 720 and 730 for receiving a rotating force and driving the rubbing belt 710, and a motor 740 for supplying the rotating force to the first or second pulley 720 and 730 to rotate the first and the second pulleys 720 and 730. The rubbing pile 118 is aligned at an angle about ±30 degrees with respect to the weft 1 by means of the rubbing belt 710. FIG. 2B shows exemplary rubbing piles aligned at an angle of ±30 degrees with respect to the dotted lines that are parallel to the weft.

As shown in FIG. 2C, the rubbing cloth fabric 600 is cut to fabricate the rubbing cloth 800. Particularly, the rubbing cloth 800 is cut to have a width similar to the length of the circumference of the rubbing roller 300, and to have a length similar to the length of the rubbing roller 300.

Accordingly, it possible to prevent a scratch from being formed on the alignment film 400 due to the rubbing pile 115 irregularly disposed on the rubbing cloth 800 during rubbing process of the alignment film 400.

Also, even though the alignment film 400 has a size larger than the width of the rubbing cloth fabric 600, it is able to obtain the rubbing cloth 800 having a size appropriate to the size of the alignment film 400 by controlling a cutting length in the length direction of the rubbing cloth fabric 600.

Hereinafter, a method for manufacturing an LCD using the rubbing cloth according to the present invention.

The LCD includes a TFT substrate and a color filter substrate. A polyimide thin film layer is formed on the TFT substrate having a TFT, a gate line, a data line and a pixel electrode. A rubbing process is performed on the polyimide thin film layer so as to align the liquid crystal.

The rubbing process for the polyimide thin film layer is performed by means of the rubbing roller 300 with which the rubbing cloth 800 is wound.

The rubbing cloth 800 wound around the rubbing roller 300 is fabricated by interweaving the weft 1 and the warp 2 having the length longer than that of the weft 1, and the rubbing pile 118 parallel to the weft 1 thereon is disposed on the rubbing cloth 800.

The alignment groove is formed on the polyimide thin film layer by rubbing the rubbing pile 118 of the rubbing cloth 800 against the polyimide thin film layer. The alignment groove is formed to have a direction parallel to the aligning direction of the rubbing pile 118, so that the liquid crystal is aligned parallel to the aligning direction of the rubbing pile 118.

The alignment groove is formed on the color filter substrate by the process similar to above process. The alignment groove is tilted by a predetermined angle with respect to the alignment groove formed on the TFT substrate. An LCD panel is manufactured by interposing the liquid crystal between the color filter substrate and the TFT substrate after assembling the color filter substrate with the TFT substrate. The LCD is manufactured by assembling parts such as a lamp, a light guiding plate, a power supply device, etc., with the LCD panel.

INDUSTRIAL APPLICABILITY

According to the present invention, the rubbing cloth is formed by interweaving the warp with the weft having a length shorter than that of the warp, and the rubbing pile is formed on the rubbing cloth and is aligned parallel to the warp.

Accordingly, it is possible to manufacture a various size of rubbing cloth regardless of a length of the alignment film, and to increase yield of the rubbing cloth.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A rubbing cloth to align a liquid crystal, the rubbing cloth being formed by cutting out a portion of a rubbing cloth fabric along the length of a warp on the rubbing cloth fabric, wherein the rubbing cloth fabric comprises:

a warp extending a first length;

a weft extending a second length shorter than the first length, the weft being interweaved with the warp; and rubbing piles aligned at an angle of about ±30 degrees with respect to the weft, the rubbing piles having a length shorter than that of the weft.

2. A rubbing cloth to align a liquid crystal, the rubbing cloth being formed by cutting out a portion of a rubbing cloth fabric along the length of a warp on the rubbing cloth fabric, wherein the rubbing cloth fabric comprises:

a warp extending a first length;

a weft extending a second length shorter than the first length, the weft being interweaved with the warp; and rubbing piles that are aligned substantially parallel to the weft.

3. A method for manufacturing a rubbing cloth to align liquid crystal, comprising:

preparing a rubbing cloth fabric including a warp having a first length, a weft having a second length shorter than the first length, the weft being interweaved with the warp, and rubbing piles irregularly formed on the rubbing cloth fabric;

rubbing the rubbing piles at an angle of about ±30 degrees with respect to the weft to align the rubbing piles; and cutting the rubbing cloth fabric in the direction of the warp.

4. The method of claim 3, wherein the rubbing piles are aligned by rubbing the rubbing piles parallel to the weft.

5. An apparatus configured to manufacture a rubbing cloth, comprising:

a rubbing belt installed in a width direction of a rubbing cloth fabric, wherein the rubbing cloth fabric includes a warp having a first length, a weft having a second length shorter than the first length and being interweaved with the warp, and rubbing piles formed on a surface of the rubbing cloth fabric;

a first pulley configured to receive a rotating force and rotating the rubbing belt in response to the rotating force;

a second pulley configured to receive the rotating force from the first pulley through the rubbing belt and to rotate with the rubbing belt in response to the rotating force; and a motor configured to supply the rotating force to the pulley.

6. A method for manufacturing an LCD, comprising:

fabricating a TFT substrate having a TFT, a power supply line configured to supply power to the TFT, and a pixel electrode configured to receive the power output from the TFT;

fabricating a color filter substrate having RGB pixels and a common electrode, and being coupled to the TFT substrate;

forming a rubbing groove by rubbing a rubbing roller against an alignment film formed on the TFT substrate and the color filter substrate, wherein the rubbing roller is wound with a rubbing cloth formed by cutting a rubbing cloth fabric, and wherein the rubbing cloth fabric has a warp having a first length, a weft having a second length shorter than the first length and being interweaved with the warp, and rubbing piles aligned at an angle of about ±30 degrees with respect to the weft, the rubbing piles having a length shorter than that of the weft;

assembling the TFT substrate with the color filter substrate; and interposing a liquid crystal between the TFT substrate and the color filter substrate.

* * * * *